United States Patent

[11] 3,598,211

[72] Inventor Donald J. Fergle
 St. Clair Shores, Mich.
[21] Appl. No. 763,669
[22] Filed Sept. 30, 1968
[45] Patented Aug. 10, 1971
[73] Assignee Eaton Yale & Towne Inc.
 Cleveland, Ohio

[54] SPEED-RESPONSIVE CLUTCH
 16 Claims, 6 Drawing Figs.
[52] U.S. Cl. .................................................. 192/.032,
 60/39.16, 192/54, 192/86, 192/103, 192/105
[51] Int. Cl. .................................................. F16d 43/00
[50] Field of Search.......................................... 60/39.16;
 192/.03, .032, .033, .034, 103 F, 104 F, .076, 54,
 86, 105 A; 415/18; 74/457

[56] References Cited
 UNITED STATES PATENTS
2,646,150 7/1953 Hobbs........................... 192/56
2,673,633 3/1954 Miller........................... 192/54
2,208,865 7/1940 Gette............................. 192/103
2,756,851 7/1956 Collins.......................... 192/.076
2,823,320 2/1958 Larsson......................... 60/39.16
2,916,122 12/1959 Hindmarch..................... 192/109 F
3,237,404 3/1966 Flanigan........................ 192/.032
3,367,106 2/1968 Robinson....................... 60/39.16

Primary Examiner— Douglas Hart
Attorney— Woodhams, Blanchard and Flynn

ABSTRACT: A torque-adjusting system for an engine-to-load, ratio-shiftable power train, wherein either the engine or the load has a sufficiently high speed or high inertia as to cause a shock in the power train upon effecting a ratio shift therein, said torque-adjusting system including a variable capacity clutch connected in the power train having (a) reactive means sensitive to the torque delivered by the engine and capable of regulating the torque output capacity of said variable capacity clutch as a function of the engine torque together with (b) means effecting a further regulating of said torque output capacity as a function of the speed of rotation of said output shaft of said engine.

INVENTOR.
DONALD J. FERGLE
BY
Woodhams, Blanchard & Flynn
ATTORNEYS

INVENTOR.
DONALD J. FERGLE
BY
Woodhams, Blanchard & Flynn
ATTORNEYS

INVENTOR.
DONALD J. FERGLE

# SPEED-RESPONSIVE CLUTCH

FIELD OF THE INVENTION

This invention relates to a variable capacity clutch, as for use with a gas turbine engine, and, more particularly, relates to a variable capacity clutch wherein the capacity of said clutch varies as functions of both the power developed in the engine and the speed of rotation of the engine.

BACKGROUND OF THE INVENTION

Coupling a mechanical transmission to a two-stage gas turbine engine has long presented a serious problem in view of the necessity of preventing overspeeding of the free turbine during the shifting operation. If all of the power being transmitted before the shift were suddenly permitted to accelerate only the power turbine wheel, a serious overspeed condition which would lead to the destruction of the turbine itself would in most cases develop within a fraction of a second. One technique for meeting this problem, namely, that used with reciprocating engines, is to change the fuel input and thereby the speed of rotation of the output of the turbine during a shift. However, the slow response of the gas generator and the thermal inertia of the turbine (particularly if it is regenerated) prevents this from being a satisfactory solution to the problem. Hence, while spur gear transmissions have been recognized as highly efficient, their uses with gas turbines, especially for automotive purposes, has been seriously restricted.

To meet this problem it has been suggested to provide devices for maintaining a continuous load on the engine during the shifting procedure. One means for accomplishing this while still bgear ratio means is illustrated by the application of Sidney Oldberg, Donald Fergle and David P. Hass, Ser. No. 551,446, filed May 19, 1966 and assigned to the same assignee as the present invention, wherein the drive train is not broken but the shift is made by engaging and disengaging the desired gears through the engaging and disengaging of appropriate friction clutches. This works well but since there is no break in the power train, and since there is a high speed and/or inertia in either or both of the engine and the load, a very rapid shift is brought about which imposes a substantial shock onto the entire drive system. This, at the least, provides a jerk which is unpleasant to the operator of the vehicle or, more seriously, it can provide a serious possibility of damage to the power train and/or the engine. Thus, it is desirable to provide means between the transmission and the engine, or elsewhere as desired in the power train, which would be automatically responsive to the operating conditions of the apparatus for softening such shock but without appreciably, if at all, impairing its operation.

It will be recognized that there are also other situations wherein a pair of ratio-connected shafts can each be associated with high speed and/or high inertia loads such that a sudden change in such ratio connection can impose a serious shock onto the system or at least onto certain parts thereof. Therefore, even though this invention was developed with particular respect to the problem above outlined in connection with vehicular use of turbine engines, there are many other areas in which the same basic problem exists and in which the invention would be fully applicable. Accordingly, although the hereinafter following description is set forth in terms of a turbine engine for vehicular use, it will be recognized that at least the broader aspects of the invention will be equally applicable with respect to other types of prime movers and other environments of use, including nonautomotive, where the above-indicated basic conditions exist.

Accordingly, the objects of this invention include:

1. To provide a power train system between an engine and a load applicable where either or both of the engine and the load is of high speed and/or high inertia and wherein ratio changes may be made between the engine and the load more quickly than the engine can follow, whereby with the invention the transmission of torque between the engine and the load will be modified in response to changes in operating conditions to compensate for changes in torque resulting from changes in said ratios and thereby minimize the application of shocks to the engine, the power train or the load.
2. To provide a device as aforesaid which is particularly applicable to automotive use wherein the engine is a two-shaft turbine and the ratio mechanism is a spur gear transmission.
3. To provide apparatus as aforesaid utilizing a variable capacity clutch in the power train and rendering its torque-transmitting capacity automatically responsive to the operating conditions in the power train.
4. To provide a power train as aforesaid utilizing a variable capacity clutch which minimizes the likelihood of inertia shock loads being applied to the turbine engine upon a change in the load applied to the output of the variable capacity clutch.
5. To provide a variable capacity clutch as aforesaid and automatic controls therefor wherein the torque-transmitting capacity of the clutch is inversely proportional to the speed of rotation at the output of the prime mover.
6. To provide a variable capacity clutch as aforesaid and automatic controls therefor wherein the capacity of the clutch is directly proportional to the torque developed in the prime mover.
7. To provide a variable capacity clutch as aforesaid and controls therefor of such construction that it is economical to manufacture and to maintain in good operating condition.
8. To provide a variable capacity clutch as aforesaid and controls therefor which may, within the scope of the invention, be widely modified to meet a variety of specific operating requirements and conditions.

Other objects and purposes of the invention will be apparent to persons acquainted with apparatus of this general type upon reading the following specification and inspecting the accompanying drawings, in which.

Figure 2:
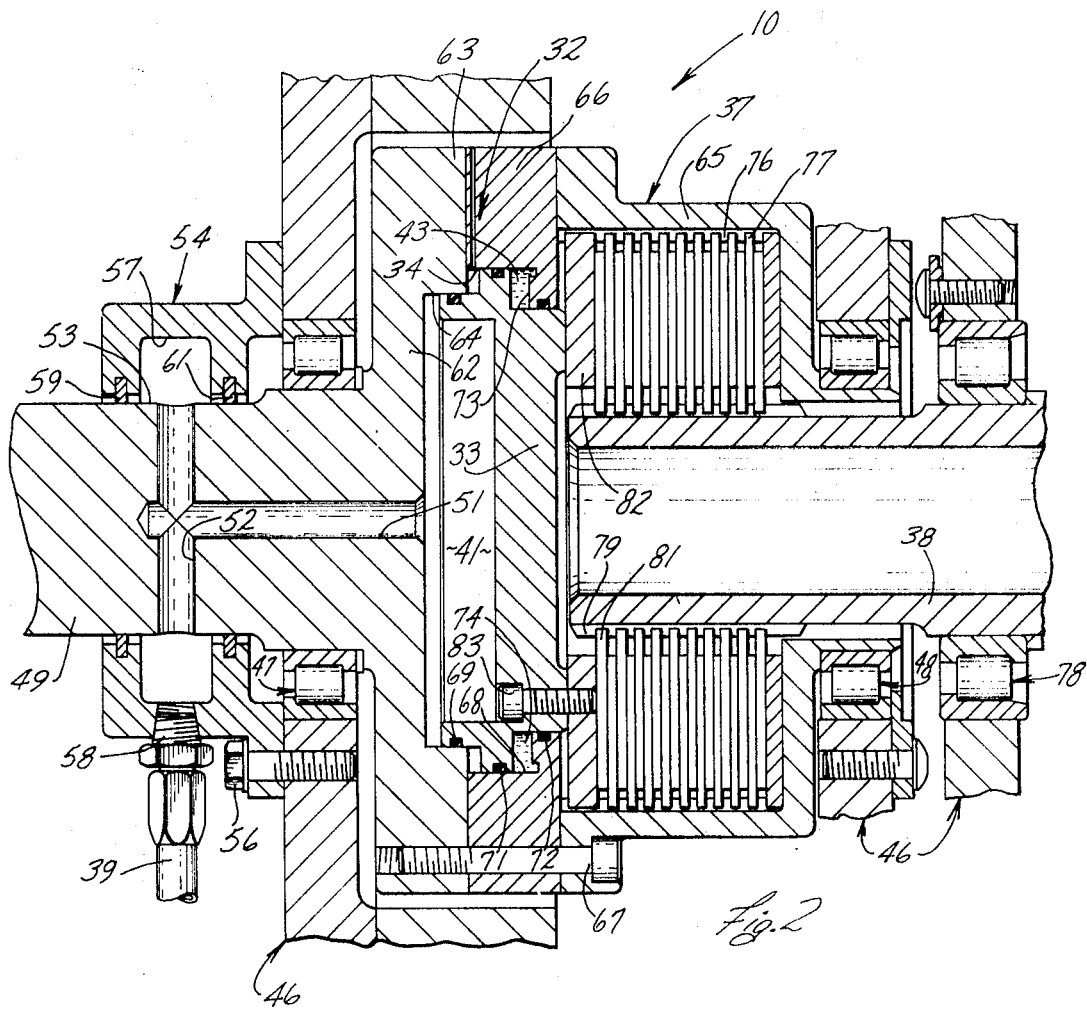
FIG. 2 is a central longitudinal sectional view of the variable capacity clutch.

Certain terminology will be used in the following description for convenience in reference only and will not be limiting. The words "up," "down," "right" and "left" will designate directions in the drawings to which reference is made. The words "in" and "out" will refer to the directions toward and away from, respectively, the geometric center of the device and designated parts thereof. Said terminology will include the words above specifically mentioned, derivatives thereof and words of similar import.

SUMMARY OF THE INVENTION

The objects and purposes of the invention are met by providing a variable capacity clutch connected to the output of a prime mover, said variable capacity clutch having (a) reactive means sensitive to the torque developed in the prime mover and capable of regulating the torque-transmitting capacity of the variable capacity clutch as a function of said torque, and (b) having means further regulating said capacity as a function of the speed of rotation of said output.

More particularly with respect to the particular embodiment of the invention here utilized to illustrate the invention, the variable capacity clutch is connected between the output shaft of a two-shaft gas turbine engine and a spur gear transmission of the type which maintains a constant connection therethrough throughout a shifting procedure in order to prevent turbine runaway and this, in turn, causes a more rapid ratio change than the engine speed can follow. The torque-transmitting capacity of the variable clutch is automatically regulated according to engine and load operating conditions. In certain preferred embodiments the regulating is carried out as a direct function of the torque produced by the engine as, for example, measured by the gas producer pressure or compressor speed in a turbine, or as measured by fuel pressure or throttle position in either a turbine or piston engine and inversely according to an operating speed such as at the output of the prime mover.

DETAILED DESCRIPTION

Figure 1:
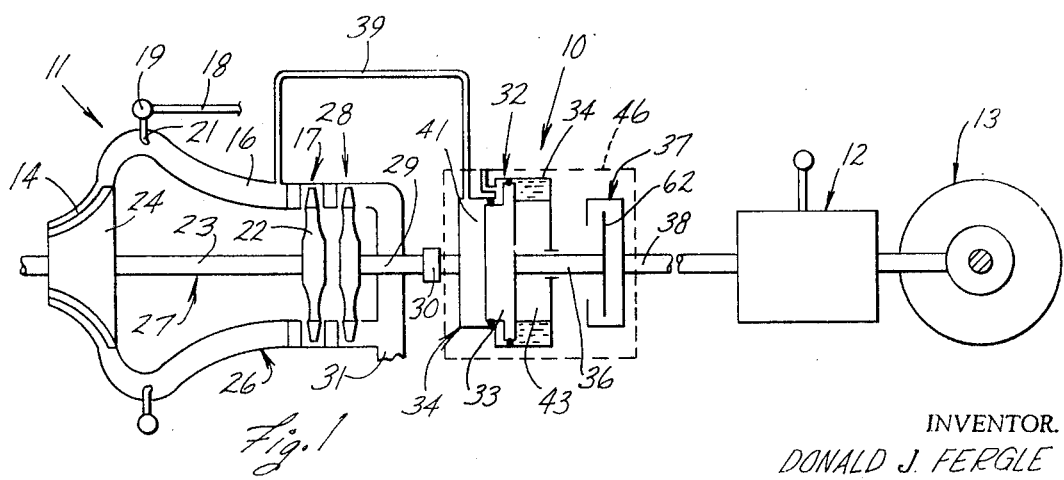
FIG. 1 is a schematic diagram of a speed-responsive variable capacity clutch embodying the invention.

Referring first to FIG. 1, a variable capacity clutch 10 is connected between the output of a free-turbine-type gas turbine engine 11 of the type for use in land vehicles such as trucks and a transmission 12, the output of which is connected to the drive wheels 13 of a vehicle. The engine 11 includes a gas generator 16 which here comprises a compressor 14, combustion apparatus 16 and a compressor turbine 17. The combustion apparatus comprises a fuel pump (not shown) which delivers fuel to a line 18, manifold 19 and nozzles of which one appears at 21. The fuel control may be of any suitable type. The details thereof are immaterial to this invention.

The turbine 17 includes a rotor 22 which is connected by a shaft 23 to the rotor 24 of the compressor 14. The rotors 22 and 24 and the shaft 23 constitute the gas generator rotor 27, hereinafter referred to as the rotor. The motive fluid or driving gas discharged from the gas generator flows through a power turbine 28 which drives a power output shaft 29. The power output shaft 29 is coupled through an appropriate coupling device 30 to the clutch mechanism 10 and transmission 12 to a load such as the wheels 13 of a vehicle. The gas exhausted from the power turbine is discharged through a duct 31.

The speed and pressure-responsive portion 32 of the clutch 10 generally comprises a piston 33 movable axially within a cylinder 34 and has a rod 36 movable axially therewith for increasing or decreasing the degree of engagement of the torque transmitting device 37. The output shaft 38 of the variable clutch 10 is connected to the input of the transmission 12, which may be of the type shown in Ser. No. 551,446.

The variable clutch 10 is connected to the engine in any convenient manner to react to variations in the torque produced by the engine for urging the rod 36 in a torque-modifying manner. The clutch 10 can be arranged to respond for this purpose to any of several torque indicators, such as fuel supply, fuel pressure, mechanical throttle position or, in a two shaft turbine, the compressor pressure or speed. In the illustrated embodiment, however, the piston 33 is arranged to respond to the pressure produced by the gas generator. Thus, a passageway 39 connects the combustion chamber 16 with the left end of the cylinder 34 and a chamber 41 on the left side of the piston 33. To relate the position of said piston 33 to the engine speed, a quantity of trapped fluid, such as oil, is enclosed at the right end of the cylinder 34 in a chamber 43.

Referring now in more detail to the particular embodiment of the variable capacity clutch 10 illustrated in FIGS. 1 and 2, the input shaft 49 to the speed and pressure-responsive portion 32 of the clutch 10 is rotatably supported in a frame 46 by bearings 47 and 48 and has an axial passageway 51 in the right end thereof and a radial passageway 52 connecting the innermost end of the passageway 51 to the periphery 53 of the input shaft 49. The passageway 51 is in fluid communication with the chamber 41 in the speed and pressure-responsive portion 32 of the clutch 10. A fluid-supplying device 54 is secured to the frame 46 by a plurality of screws 56. The fluid-supplying device 54 has a chamber 57 therein which encompasses the shaft 49 and communicates with the radial passageway 52. The chamber 57 has an opening 58 therein to which the passageway 39 is connected. A pair of seals 59 and 61 prevent the escape of fluid from the chamber 57 when same is pressurized by the gas generator 26. Thus, the passageway 39 is in fluid communication with the chamber 41 through the chamber 57 and passageways 51 and 52.

A flange 62 extends radially outward from the right end of the input shaft 49. An annular rib 63 extends axially rightwardly from the outer end of the flange 62 and defines a recess 64. An annular ring 66 is sandwiched between the rib 63 and a clutch housing 65 and both are secured to the flange 62 by a plurality of screws 67.

The piston member 33 is movable axially of the recess 64 and the inner portion 68 of the ring 66. The piston member 33 in this embodiment has axially spaced seal means, such as O-rings 69 and 71, sealingly engaging the surface of the recess 64 and the inner surface 68 of the ring 66. A seal ring 72 which is secured to the inner portion 68 of the ring 66 engages the outer surface of the piston member 33. Alternatively, of course, the O-rings 71 and 72 may be eliminated if the clearance surrounding the piston 33 is minimized or if a supplementary oil supply to the chamber 43 is provided. A flange 73 projects radially inwardly on the ring 66 and serves to limit the rightward movement of the piston member 33.

A quantity of fluid 74 is trapped between the right side of the piston member 33 and the flange 73 in the chamber 43. Thus, a high rotational speed will generate within the fluid 74 a high radially outward pressure. Since any pressure in a liquid is exerted in all directions, such centrifugally created pressure will also urge a leftward movement of the piston member 33.

The torque-limiting device 37 comprises a clutch housing 65 having in this embodiment a splined internal surface 76 and a plurality of separator plates 77 splined thereto. The output shaft 38 which is rotatably supported on the bearing 78 has a splined surface 79 and a plurality of clutch plates 81 of any suitable frictionally engageable type are splined thereto and interdigitated with the separator plates 77. An annular ring 82 is also splined to the housing 65, engages the left clutch plate 81 and is secured to the piston member 33 by a plurality of screws 83. Thus, a rightward movement of the piston member 33 will cause an increasing engagement of the plates 77 and 81 to increase the torque applied to the shaft 38.

OPERATION

The operation of the apparatus embodying the invention will be described in detail hereinbelow for a better understanding of the invention.

The invention makes it possible to adjust the maximum torque transmittable to the load through the transmission of a vehicle in order to minimize the likelihood of a jerky transmission output which will occur when the turbine engine is operated under the rapidly changing load conditions which occur with the shifting of a spur gear transmission as a result of changing road conditions, such as up hill or down hill operation. Thus, the torque-limiting device 37 has a fixed speed-torque relation to maintain the slippage point of the clutch plates 77 and 81 above but close to the steady speed engine torque, such slippage point being varied in conformance with the instantaneous engine operating conditions.

For example, to avoid jerky operation when shifting a spur gear transmission, it is desirable to selectively vary the engine speed during the shifting procedure. This means that during a shifting procedure the turbine engine 11 must change speed very materially and quickly or the torque-limiting device 37 must allow a slippage of the clutch plates 77 and 81 to occur between the output shaft 29 of the turbine engine and the input shaft 38 to the transmission. If no slippage is permitted, the inertia torque generated by the turbine engine, whether accelerating or decelerating, would introduce undesirable shocks to the turbine engine 11, transmission 12 and load 13.

Figure 6:
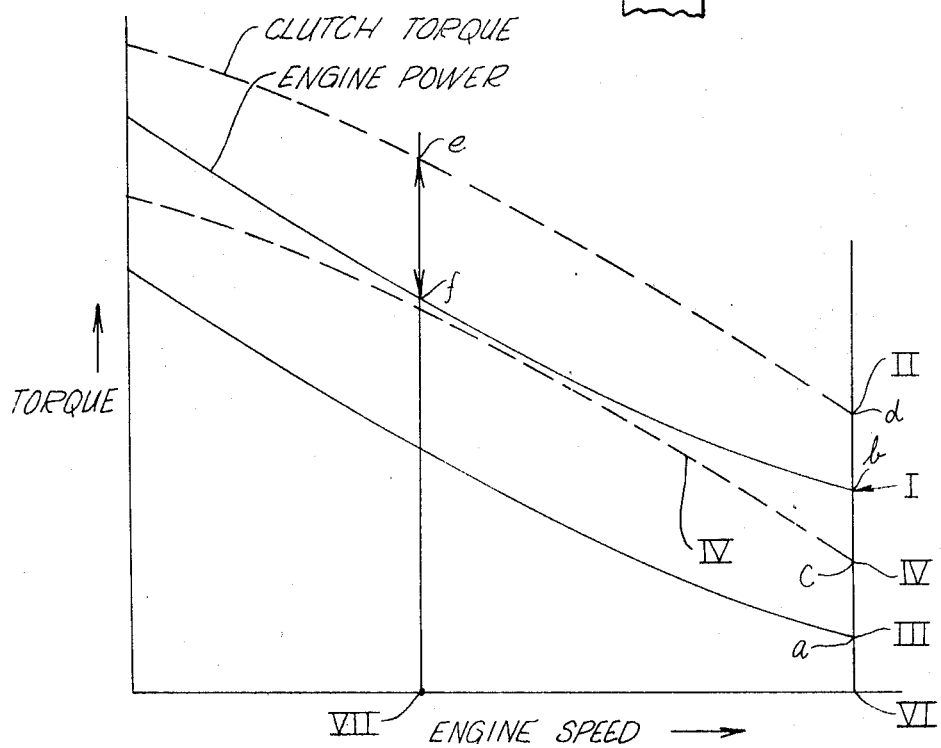
FIG. 6 shows graphically the speed-torque relationships present in one embodiment of the invention.

This is illustrated graphically in FIG. 6, wherein line 1 illustrates the torque-speed relationship delivered by the engine at a given control, as fuel, setting. This relationship is well recognized by those skilled in the art and no detailing thereof is necessary. Line II illustrates the torque transmittable by the clutch at said given control setting, as indicated by a suitable indicator, which is the gas producer pressure in the present illustrated embodiments, with the clutch torque here varying inversely with respect to the free turbine speed. The torque transmittable by the clutch thus is maintained slightly above the engine output torque at all speeds of operation so as to absorb minor variations in torque conditions but to permit slippage and thereby eliminate shocks when the torque load moves more than a small distance above the normal condition. Line III represents the engine torque at a different control setting and line IV represents the clutch torque corresponding to the control setting of line III.

Assuming first, for example, that a low input speed is supplied to the transmission and that it is desired to accelerate the vehicle, an increase of the fuel input through the line 18, manifold 19 and nozzles 21 will result in an increased pressure in the combustion apparatus 12. This increase in pressure will be delivered through the passageway 39 to the chamber 41 to urge the piston member 33 rightwardly to engage more tightly the plates 77 and 81 of the torque limiting device 37. With no substantial increase in rotor speed, the pressure on the right-hand side of the piston 33 remains close to constant. Thus, the torque-transmitting capacity of the clutch is increased and an increased torque in the output thereof is obtained to drive wheels 13 to accelerate the vehicle. This is represented by a change in power output from "a" to "b" in the graph of FIG. 6 and a corresponding change in clutch torque capacity from "c" to "d."

Assume next, for example, that an upshift is now desired in the transmission. Since the input speed to the transmission in a low gear is higher than it would be in a higher gear after the upshift, the input speed to the transmission will be decreased. The fuel input to line 18, manifold 19 and nozzles 21 may be assumed to be constant for the purposes of the present illustration and this is a realistic assumption inasmuch as it is common practice in the operation of trucks and other heavy vehicles to maintain the accelerator pedal unchanged during such a shift. Thus, the objective is to move from "b" to "f" on the graph of FIG. 6. However, when the new shift relationship is first created so that the engine speed must be quickly diminished, the torque change applied to the power train may be severe. Since this will happen very quickly, practically instantaneously, upon entry of the transmission into the new ratio relationship, this if unrelieved could place a serious shock onto the drive train system, particularly in view of the high inertia of both the turbine engine and the vehicle. However, with the apparatus of the invention the torque thus appearing in the power train is of a magnitude higher than that which the clutch 37 (or its counterparts in the other embodiments shown) will transmit and the clutch will accordingly slip. At this same time the engine speed is diminishing which reduces the centrifugal force developed in the chamber 43 (FIGS. 1 and 2) and thereby diminishes the leftward pressure imposed upon the piston 33 whereupon said piston 33, in response to the steady gas producer pressure continuing in the chamber 41, tends to move rightwardly to increase the clamping force in the pressure responsive portion 32 of the clutch. Thus the torque curve II rises as the engine speed diminishes and eventually reaches a value sufficient to terminate the slippage, whereupon the clutch now remains engaged as the engine torque is established at the new setting indicated at point "f." The upshift is now completed.

The downshift is essentially a movement from point "f" to point "b" on the graph of FIG. 6 and is the reverse of the above-described upshift.

If, of course, the power output of the engine is also varied during a shift, the operation becomes somewhat more complex inasmuch as the system may move from the lines I and II back to, for example, lines III and IV. However, in all cases the piston 33 and cylinder 34 will maintain the torque-transmitting capability of the variable capacity clutch 10 at a value sufficiently above that of the engine to enable same to function as above-described, namely that under all conditions of operation the variable clutch will follow the changes of the torque output of the engine (or load torque applied to the engine) so as to permit slippage where necessary to prevent major shocks and jerking but yet to maintain under conditions of steady or more slowly changing torque requirements a sufficient margin of torque-transmitting capacity over the output of the engine at any given time to assure proper operation.

MODIFIED CONSTRUCTION OF FIGURES 3 AND 4

Figure 3:
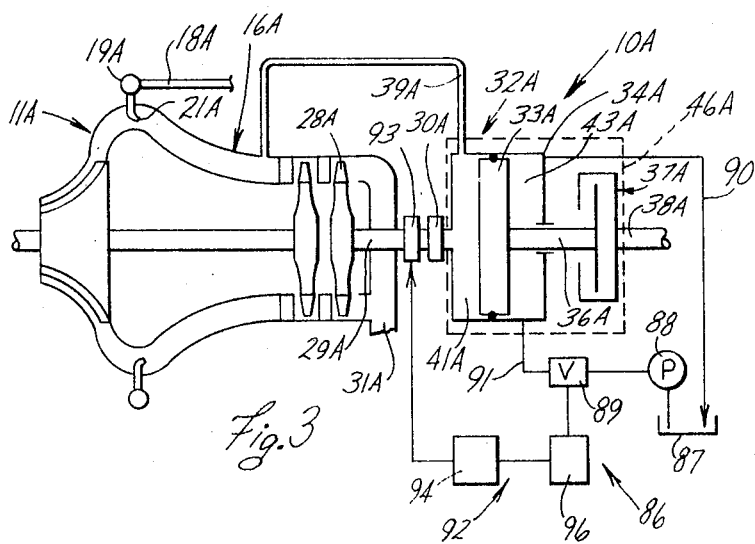
FIG. 3 is a schematic diagram of a modified speed response variable capacity clutch.

The modified embodiment illustrated in FIG. 3 is similar to the embodiment illustrated in FIG. 1 except that the trapped fluid concept of FIG. 1 is replaced with a variable fluid input system 86. Thus, by appropriate programming, including manual control, of the fluid input through the system 86 an even more complete control over the clutch torque capacity may be obtained than was obtainable with the embodiment of FIGS. 1 and 2.

Figure 4:
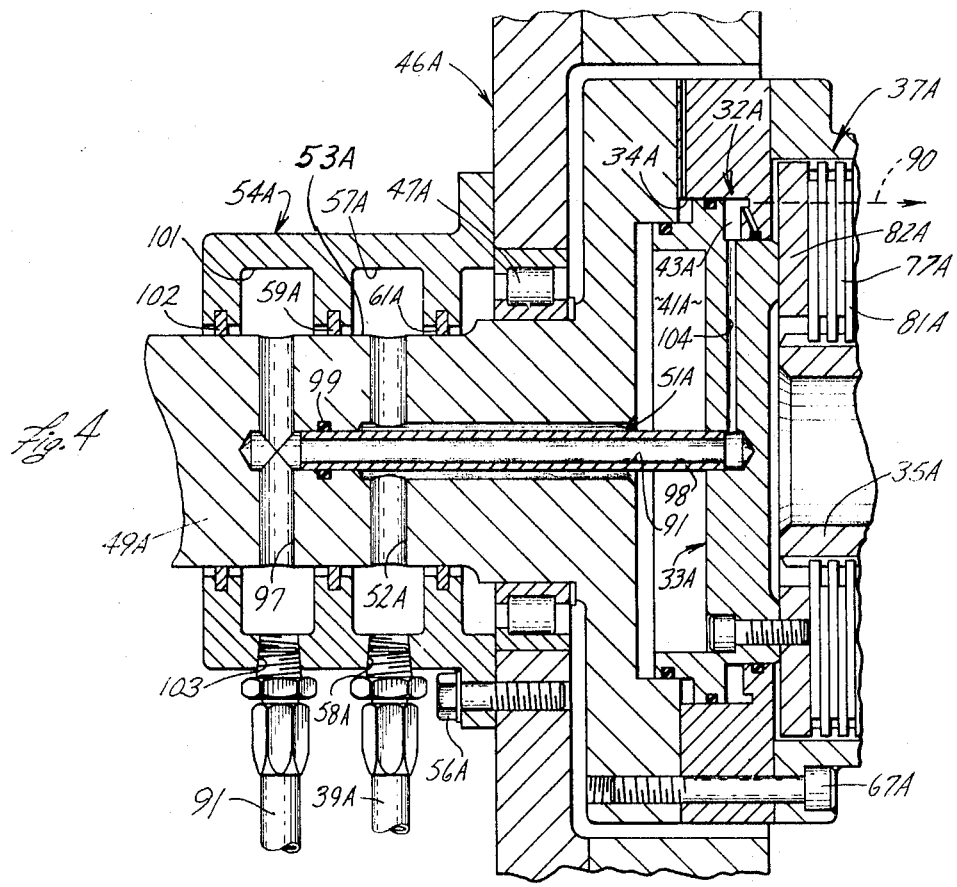
FIG. 4 is a central longitudinal sectional view of the modified speed response variable capacity clutch.

Referring now to the details of the embodiment shown in FIGS. 3 and 4 and for purposes of discussion, the components of the modified speed-responsive variable capacity clutch 10A will be referred to by the same reference numerals used to designate corresponding parts of the clutch 10 but with the suffix "A" added thereto.

The variable fluid input system 86 comprises a reservoir 87, a pump 88 and a valve 89. The pump 88 delivers fluid to the valve 89 which regulates the flow of fluid through a passageway 91 to the chamber 43A in the speed-responsive portion 32A of the clutch 10A. The valve 89 is controlled by a control circuit 92 which comprises a magnetic pickup device 93 which supplies a signal which bears a selected relationship, here directly proportional, to the speed of rotation of the power shaft 29A of the turbine engine 11A. These signals are applied to a network 94 which converts the pulses into a potential which is appropriately proportional to the frequency of the input so that a servomechanism connected in circuit with the output thereof will regulate the valve 89 in the desired manner.

Referring now to the structural embodiment of FIG. 4, the input shaft 49A is rotatably supported in the frame 46A by a bearing 47A and has an axial passageway 51A in the right end thereof and a radial passageway 52A connecting the innermost end of the passageway 51A to the periphery 53A of the input shaft 49A. The passageway 51A is in fluid communication with the chamber 41A in the same manner as was illustrated in FIG. 2. A radial passageway 97 is also provided in the input shaft 49A leftwardly and parallel to the radial passageway 52A. The center portion of the passageway 97 is connected by a conduit 98 which extends through the central portion of the passageway 51A to the center portion of the piston member 33A. The conduit 98 which defines the passageway 91 is secured to the central portion of the piston element 33A and the right end thereof is in fluid communication with the chamber 43A through a radial passageway 104. A passageway 90 may, if desired, be used to provide a return path for the fluid entering the chamber 43A to the reservoir 87. A seal 99 serves to prevent the flow of fluid between the two radial passageways 52A and 97.

A fluid supply device 54A is secured to the framework 46A by a plurality of screws 56A. The fluid supply device 54A has a pair of chambers 57A and 101 therein which encompass the shaft 49A and communicate respectively with the radial passageways 52A and 97. A pair of seals 59A and 61A prevent the escape of fluid from the chamber 57A when same is pressurized by the combustion apparatus 16A. Thus, the passageway 39A is in fluid communication with the chamber 41A through chamber 57A and passageways 52A and 51A. A pair of seals 59A and 102 prevent the escape of fluid from the chamber 101 when same is pressurized by the pump 88. Thus, the passageway 91 is in fluid communication with the chamber 43A through the chamber 101A and passageway 97, conduit 98 and the radial passageway 104 in the piston member 33A.

The modified embodiment of the speed-responsive variable capacity clutch 10A operates in a manner closely similar to the embodiment illustrated in FIGS. 1 and 2. That is, and assuming that it is desired to accelerate the vehicle, an increase of the fuel input through the line 18A, manifold 19A and nozzle 21A will result in an increased pressure in the combustion apparatus 16A. This increase in pressure will be delivered through the passageway 39A to the chamber 41A to urge the piston member 33A rightwardly to increase the pressure on the clutch plates 77A and 81A. At the same time for so long as the output shaft 29A of the power turbine 28A is rotating at an essentially steady rate, the frequency generated by the magnetic pickup device 93 is essentially unchanged so that the servomechanism 96 will maintain essentially the same pressure in the chamber 43A. Thus, the pressure from the combustion apparatus applied through the conduit 39A will be greater than the fluid pressure created by the pump 88 and it will cause a movement of the piston element 33A rightwardly in a manner described above. Thus, the increased torque to the input of the transmission will cause an increased torque in the output thereof to the drive wheels to accelerate the vehicle.

Operation during an upshift or downshift of the transmission system will be the same as that above described in connection with FIGS. 1 and 2 excepting that as above indicated, the change in pressure within the chamber 43A due to changes in engine speed will be brought about by the control system 92 rather than completely by centrifugal force as in the embodiment of FIGS. 1 and 2. Thus, it will be recognized that the pattern of pressure change within the chamber 43A can be programmed in any manner desired by appropriate design in any conventional manner of the network 94 and/or the servomechanism 96. Thus the torque capacity of the clutch 37A can be controlled in any manner desired inasmuch as it is the result of the net pressures on either side of the piston 33A.

Thus, if desired, the output of the network 94 can be designed so that the servomechanism 96 will operate the valve 89 in a manner to permit the torque capacity of the speed-responsive variable capacity clutch 10A to vary linearly, or any other desired fashion, directly or inversely, with the speed of rotation of the power turbine 28A and power level or pressure produced in the combustion apparatus 12A.

MODIFIED CONSTRUCTION OF FIGURE 5

Figure 5:
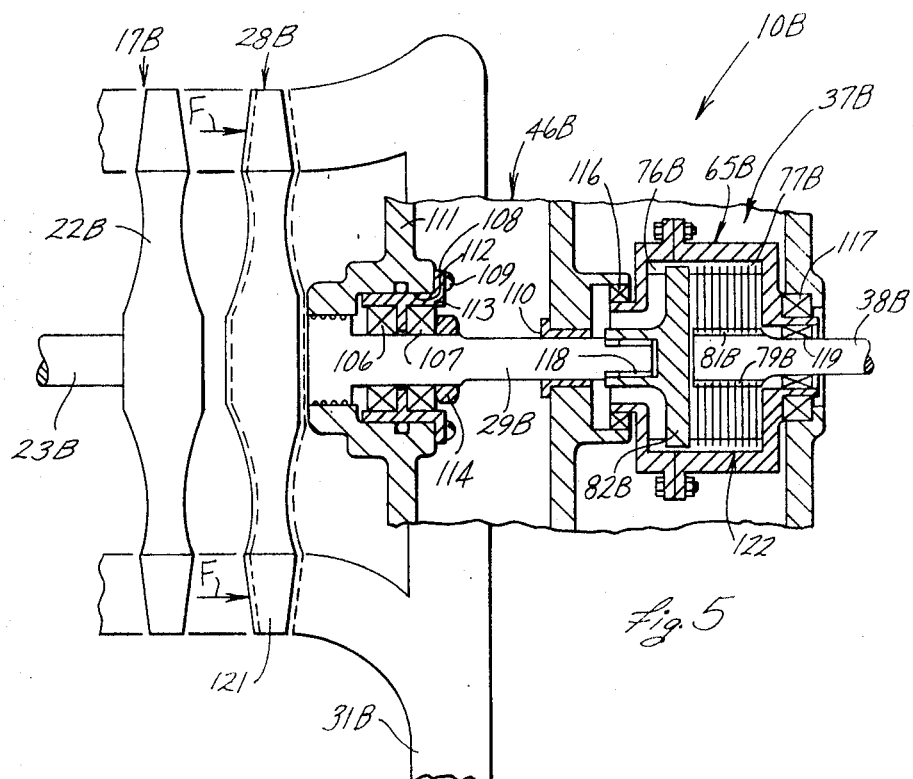
FIG. 5 is a fragmentary longitudinal sectional view of a further modified speed-responsive variable capacity clutch.

The modified embodiment 10B of FIG. 5 operates in a similar manner as compared to the embodiments illustrated in FIGS. 1—4. For purposes of discussion, the components of the modified construction 10B will be referred to by the same reference numerals designating corresponding parts of the clutch 10 but with the suffix "B" added thereto.

In this particular embodiment, the shaft 29B of the power turbine 28B is supported for rotation by a pair of bearings 106 and 107, the bearing 106 being a radial bearing and the bearing 107 being a thrust bearing. Said bearings are retained in a sleeve 113 which is fixed within the member 111 of the frame structure 46B by the flange 108 and screws 109. A nut 114 is fixed to the shaft 29B to limit leftward movement of the shaft 29B. A radial bearing 110 supports the other end of the shaft 29B.

The torque-limiting device 37B includes a clutch housing 65B having a splined surface 76B on the inner surface thereof and a plurality of clutch separator plates 77B splined thereto. The output shaft 38B has a splined surface 79B and has a plurality of clutch plates 81B splined thereto and interdigitated with the separator plates 77B. The clutch housing 65B is rotatably supported in the frame 46B by a radial bearing 116 and thrust bearing 117 at the axial ends of said housing, said thrust bearing being effective for checking movement to the right. A clutch pressure plate 82B is secured to the power shaft 29B by splines 118 and rotatable therewith. The radially outermost portion of the clutch plate 82B is splined to the splines 76B on the clutch housing 65B. Thus, the power shaft 29B rotatably drives the clutch plate 82B, the clutch housing 65B and the separator plates 77B. The output shaft 38B is supported for rotation by a bearing 119 located within the clutch housing 65B.

Thus, when a substantial pressure exists on the power turbine 28B, it will act thereagainst in the direction indicated by the arrows F in FIG. 5 and the apparatus will assume the position shown in broken lines in the drawing. In such condition, the shaft 29B slides within the bearings 106 and 107 to the right and substantial force is applied by the plate 82B against the separator plates 77B and clutch plates 81B of the torque limiting device 37B and the thrust thereof will be received by the thrust bearing 117. When said gas producer pressure is diminished, the resiliency of the separator and clutch plates will move the power turbine 28B leftwardly to the position shown by solid lines in FIG. 5. In such position, the thrust nut 114 will act against the thrust bearing 107 to limit leftward movement of the shaft 29B.

From this it will be recognized that the operation of the embodiment of FIG. 5 will be essentially the same as that of the above-described embodiments even though the structure is substantially different. Particularly, an increase in gas producer pressure will as in the above-described embodiments, tend to increase the engagement of the plates 77B and 81B and thereby increase the torque-transmitting capacity of the torque-limiting device 37B. This parallels the action of the gas producer pressure in the embodiment of FIGS. 1—4 acting on the leftward side of the piston 33 or 33A to increase the torque transmitting capacity of the torque transmitting device 37 or 37A. Similarly, an increase in the rate of rotation of the power turbine 28B will increase the angle of the so-called "apparent" pressure against the blades with respect to the axis of the turbine and hence, with a steady gas pressure applied, decrease the component thereof acting parallel to said axis. Thus the axial rightward force on the turbine 28B will diminish and the resiliency of the plates 77B and 81B move said shaft leftwardly and diminish the torque-transmitting capacity of the torque-limiting device 37B. Conversely, a slowing of said power turbine 28 under a steady gas producer pressure increases the axial component of the pressure effective against the turbine blades, urges said shaft 29B rightwardly and increases the pressure between the plates of the torque-limiting device 37B. Thus, in this embodiment also, the torque-transmitting capacity of the torque-limiting device 37B increases or decreases directly with the gas producer pressure applied to the power turbine and inversely with the speed of rotation of said power turbine.

The operation, therefore, of said embodiment of FIG. 5 may be analyzed similarly to that of the preceding embodiment. Assuming first that it is desirable to accelerate the vehicle, an increased quantity of fuel fed to the combustion apparatus will increase the pressure therein. This increased pressure will exert an axial force F on the turbine blades 121 of the power turbine 28B. As a result, the power turbine 28B will be moved rightwardly to the broken line position by the force F on the blades 121 as above described to increase the engagement pressure of the clutch plates 77B and 81B thereby resulting in an increased torque output on the shaft 38B.

Assuming next that an upshift takes place, the same analysis may be made that was above made with respect to the embodiment of FIGS. 1 and 2 and with reference to the graph of FIG. 6 (for the apparatus of FIG. 5 the clutch-torque curves will be slightly concave instead of convex as shown for the hydraulic unit of FIGS. 1 and 2, but the general relationship is still sufficiently valid for descriptive purposes). The load torque imposed by the inertia of the vehicle onto the drive train at first creates a torque tendency between the engine and the drive wheels in excess of that for which the torque-limiting device 37B is adjusted to carry (the torque tends to rise to a point above the point "d" on the graph of FIG. 6), whereupon the torque-limiting device 37B slips and relieves the shock which would otherwise be imposed onto the drive train and the engine. The clutch continues, however, to transmit the basic torque needed to drive the vehicle. As the power turbine slows, the pressure acting in the direction of the arrows F as above described moves the shaft 29B sufficiently rightwardly to increase the pressure between the plates 77B and 81B of the torque-limiting device 37B and the torque-transmitting capacity thereof increases (moves leftwardly along the line II of FIG. 6). Thus, when the engine has slowed sufficiently, the power-transmitting capacity of the clutch increases to the value required by the load and the slippage stops. When the point "f" is reached and the shift is completed, the torque-limiting device 37B at the new speed is now transmitting the new torque being developed by the engine together with a sufficient margin of capacity to avoid slippage as a result of irregularities.

As in the preceding embodiments, a downshift from the engine speed indicated by the line VII to an engine speed indicated by the line VI is the inverse of the above-described procedure and needs no detailing.

While the foregoing description has been set forth with the transmission 12 being assumed for purposes of example to be of the type shown in the above-mentioned Ser. No. 551,446, it will be recognized that the variable capacity clutch of the invention will be useful in a wide variety of uses wherein there are rapid changes in the speed relationship between a pair of shafts comprising a power train, both of which shafts operate under conditions of high inertia and/or high speed. Thus, the transmission 12 could be a planetary system, a hydraulic drive system, an electrical speed conversion system, or any other ratio-changing system wherein the speed change occurs more suddenly than the engine can follow, particularly by such engine speed control means as fuel control. Thus, the invention could be usefully applied to diesel-driven earth movers, electric-motor-driven equipment such as heavy mixing equipment utilizing a rapidly shiftable, ratio-changeable drive between the motor and such equipment, or to an engine driving oil drilling machinery.

The embodiments of the invention in which I claim an exclusive property or privilege are defined as follows:

1. In a power train connecting a prime mover to a load, a variable capacity torque-transmitting device for serial connection between said prime mover and said load, comprising:
   means developing a fluid pressure representative of prime mover torque;
   first control means operative to regulate the torque-transmitting capacity of said torque-transmitting device in response to variations in said fluid pressure; and
   second control means sensitive the speed of said prime mover for simultaneously regulating the torque-transmitting capacity of said torque-transmitting device as a function of such speed.

2. The device defined in claim 1, wherein said fluid pressure is developed as a direct function of prime mover torque so that said first control means regulates said torque-transmitting capacity as a direct function of said prime mover torque.

3. The device defined in claim 1, wherein said second control means regulates said torque-transmitting capacity as an inverse function of said speed.

4. The device defined in claim 1, wherein said load comprises the ground wheels of a vehicle.

5. The device defined in claim 1, wherein said prime mover is a gas turbine engine having a gas producer and a free power turbine and wherein said first control means is sensitive to the pressure developed within said gas producer.

6. A power train for a gas generator and a free turbine driven thereby, including an output shaft connected to said turbine, the combination comprising:
   variable capacity clutch means connected to said output shaft;
   first control means sensitive to the pressure developed in said gas generator and capable of regulating the torque output capacity of said variable capacity clutch as a function of said pressure; and
   second control means regulating said torque output capacity of said variable capacity clutch as a function of the speed of rotation of said output shaft.

7. The power train defined in claim 6, wherein said first control means includes a cylinder having a piston member movable axially therein to define a first chamber on one side of said piston member; and
   wherein said first chamber is connected by means defining a passageway to said gas generator and translation means are provided for varying said clutch capacity in response to movement of said piston.

8. The device defined in claim 6, wherein said second control means regulates said torque output capacity clutch inversely of the speed of rotation of said output shaft and comprises a cylinder having a piston therein defining a chamber and a quantity of fluid trapped in said chamber;
   translation means for varying said clutch capacity in response to movement of said piston;
   whereby said trapped fluid is affected by centrifugal force caused by the speed of rotation of said turbine and generates a pressure which causes said piston member to move in a direction so that the output torque of said clutch varies inversely of the speed of rotation of said output shaft.

9. The device defined in claim 6, wherein said second control means includes a cylinder having a piston therein defining a chamber and pressure-creating means and means regulating the pressure of fluid supplied to said chamber as a function of the speed of rotation of said output shaft;
   translation means for varying said clutch capacity in response to movement of said piston;
   whereby a change in pressure in said gas generator will vary the torque output of said variable capacity clutch means and said pressure developed by said pressure-creating means and regulated by said regulation means varies said torque as a function of the speed of rotation of said output shaft.

10. The power train as defined in claim 6, wherein said first control means includes a cylinder having a piston member movable axially therein to define first and second chambers on opposite sides of said piston member; and
    wherein said first chamber is connected by means defining a passageway to said gas generator; and
    wherein said second control means regulates said torque inversely of the speed of rotation of said output shaft and comprises a quantity of fluid trapped in said second chamber;
    whereby said trapped fluid is affected by centrifugal force caused by the speed of rotation of said turbine and generates a pressure which opposes said pressure in said gas generator to cause said piston member to move in a direction relative to said variable capacity clutch means so that the output torque thereof varies as a function of the speed of rotation of said output shaft.

11. The device as defined in claim 6, wherein said first control means comprises a cylinder having a piston member movable axially therein defining first and second chambers on opposite sides of said piston member; and
    wherein said first chamber is connected through a passageway to said gas generator; and
    wherein said second control means includes pressure creating means and means regulating the application of pressure to said second chamber as a function of the speed of rotation of said output shaft;
    whereby an increased pressure in said gas generator will vary the torque output of said variable capacity clutch means and said pressure developed by said pressure-creating means and regulated by said regulation means varies said torque as a function of the speed of rotation of said output shaft.

12. The power train as defined in claim 6, wherein said first control means comprises mounting means permitting an axial movement of said turbine; and
    wherein said second control means effects a decreasing of the axial thrust on said turbine as said speed of rotation of said output shaft increases.

13. The power train as defined in claim 12, wherein said variable capacity clutch means comprises a clutch pack having a plurality of clutch plates therein which are urged into engagement with one another when said axial thrust is applied to said turbine by the pressure developed in said gas generator and said clutch plates in said clutch pack will become separated when said gas generator pressure is reduced to urge said turbine in a direction corresponding to a low torque output of said variable capacity clutch means;

whereby an increase in pressure in said gas generator will develop a sufficient axial thrust on said turbine to urge same axially to cause an increased engagement of said clutch plates and, when said pressure in said gas generator is reduced, said clutch pack will return said turbine to said low torque output position for the variable capacity clutch.

14. In a power train connecting a gas turbine engine of the so-called "free turbine" type to a load wherein at least one of said gas turbine engine and said load has at least one of a high speed and a high inertia characteristic, a variable capacity torque-transmitting device for serial connection between said gas turbine engine and said load, comprising in combination:

first control means sensitive to the torque developed by said gas turbine engine for regulating the torque output capacity of said torque-transmitting device as a function of such prime mover torque; and second control means sensitive to the speed of said gas turbine engine for simultaneously regulating the torque-transmitting capacity of said torque-transmitting device as a function of such speed.

15. The device defined in claim 1, wherein said prime mover is a gas turbine engine.

16. The device defined in claim 15, wherein said gas turbine engine is of the type having a free turbine.